No. 888,040. PATENTED MAY 19, 1908.
E. SABO.
CASTER.
APPLICATION FILED DEC. 11, 1907.
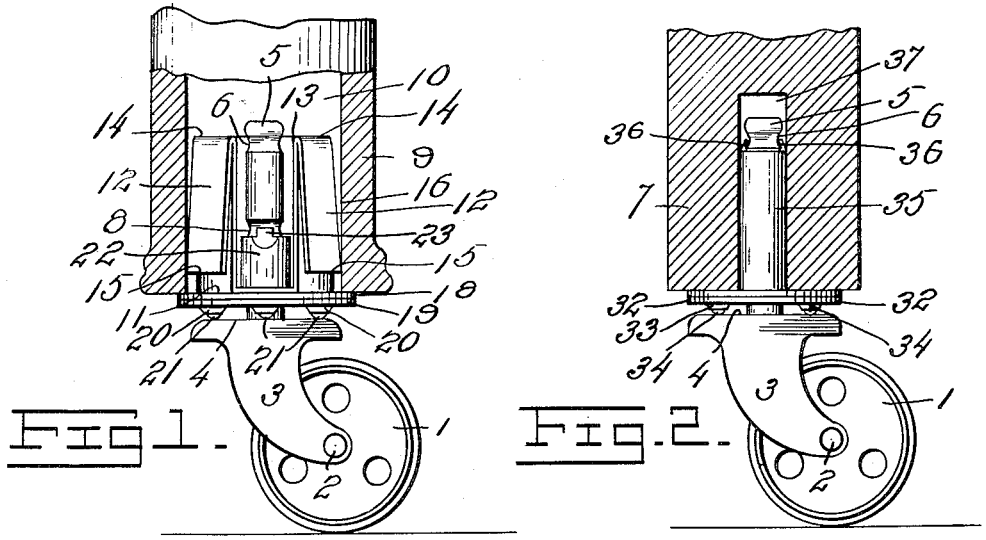
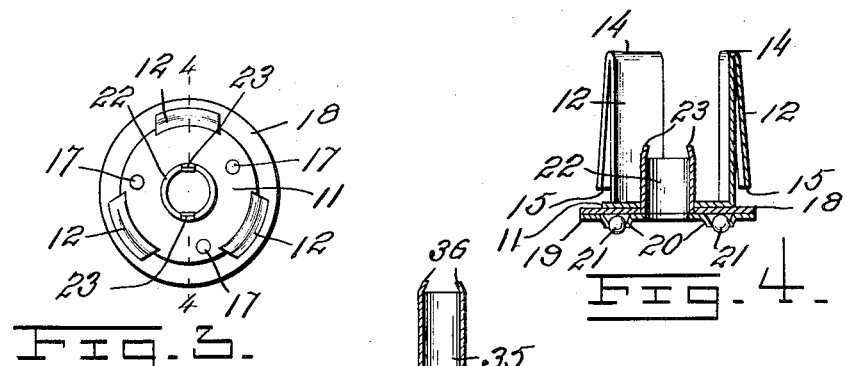
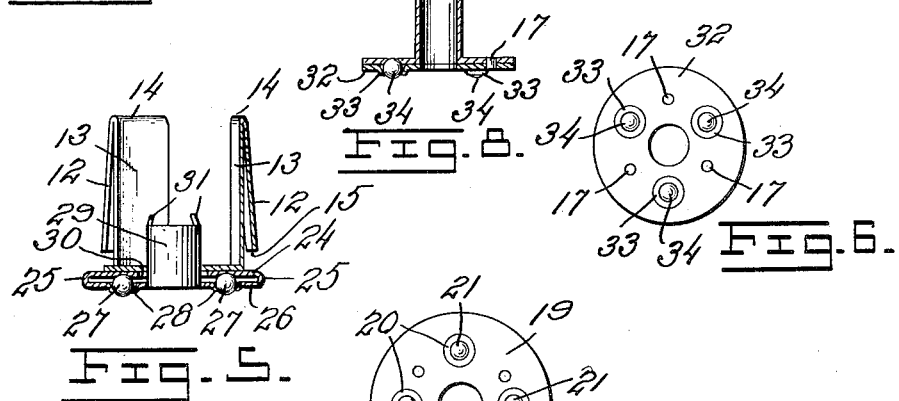
Witnesses
A. M. Whitmore,
M. B. Conway.
Inventor
Edmond Sabo,
By
Enos B. Whitmore,
Attorney.

UNITED STATES PATENT OFFICE.

EDMOND SABO, OF ROCHESTER, NEW YORK.

CASTER.

No. 888,040.　　　　Specification of Letters Patent.　　　　Patented May 19, 1908.

Application filed December 11, 1907. Serial No. 406,044.

*To all whom it may concern:*

Be it known that I, EDMOND SABO, of Rochester, in the county of Monroe and State of New York, have invented a new and useful Improvement in Casters, which improvement is fully set forth in the following specification and shown in the accompanying drawings.

This invention relates to certain new and useful improvements in casters for furniture, and it has for its objects among others to provide a simple and cheap yet durable and efficient ball-bearing caster which, while designed more particularly for iron bedsteads, may be equally applicable for use in connection with the wooden legs of beds, chairs and other devices.

The invention embodies, in its broadest sense, a plate carrying a plurality of balls designed to rest upon the body portion of the frame carrying the stem, said plate being pierced centrally and provided with an upward tubular portion having elastic extensions designed to spring into a shallow circular groove in the stem of the caster. When designed for use in connection with hollow metal members, the said plate is provided with spring portions adapted to engage and press outward against the inner surface of the said tubular member and serving to hold the caster coaxially to place therein, yet allowing it to turn freely.

The invention is capable of embodiment in a variety of forms, some of which only I have chosen to show in the present instance:

Other objects and advantages of the invention will hereinafter appear and the novel features thereof will be particularly pointed out in the appended claims.

The invention in its preferred forms is clearly illustrated in the accompanying drawings which, with the numerals of reference marked thereon, form a part of this specification, and in which Figure 1 is a view of a portion of a metal member shown partly in section with a portion broken away, with my improved caster in position therein. Fig. 2 shows the lower end of a wooden member in section with the caster in position. Fig. 3 is a top plan of the ball-bearing plate with its tubular member and spring portions. Fig. 4 is a substantially central vertical section on the line 4—4 of Fig. 3. Fig. 5 is a central vertical section, with parts in elevation, of a slightly modified form. Fig. 6 is a bottom plan of a plate with three antifriction members. Fig. 7 is a similar view of a plate with four antifriction members. Fig. 8 is a substantially central vertical section through the ball-bearing member seen in Fig. 2.

Like numerals of reference indicate corresponding parts throughout the several views.

Referring to the drawings 1 designates a wheel or roller of any well known or approved form of construction, mounted to turn on the axle 2 held in side members 3 of the support 4 for the stem 5. This stem is rigid with and rises from this support and is provided near its upper end with an annular groove 6 adapted to serve when used in connection with a wooden leg or member 7, and with an annular groove 8 at a point substantially midway of its length, as seen in Fig. 1, to serve when the device is used in connection with a tubular metal leg 9, within the bore 10 of which the stem and the retaining devices are designed to be located, as seen clearly in Fig. 1.

In the form seen in Figs. 1, 3 and 4, 11 is a plate, shown as circular, from which rise the spring portions 12, in this instance shown as three in number, see Fig. 3. These members 12 are of some hard or elastic material, preferably metal, having the inner members 13, the outer members 15 being of less length and inclined downwardly and outwardly from the bends 14, their outer surfaces pressing outwardly against the inner surface 16 of the tubular leg 9, serving to hold the caster coaxially to place therein. This plate 11 is secured by rivets or suitable means 17 to a plate 18 and also to the plate 19. These two plates 18 and 19 are of some suitable thin material as metal, the lowermost plate being pierced and having the downwardly projecting annular flanges 20 serving to hold the balls 21 against displacement yet allowing said balls to turn freely in the bearings formed by the downward bulging of the lower plate around said openings, as shown clearly in Fig. 4. These plates 18 and 19 are provided with a central opening coincident with a central circular opening in the plate 11, and projecting upwardly through the latter is a short tubular part 22, which may be integral or rigid with either of the plates 18 or 19 as may be found most expedient, and this tubular member 22 is formed at its upper end with the two diametrically oppositely disposed extensions 23 which are designed to spring into the annular groove or channel 8 of the stem 5, as shown clearly in Fig. 1, thus allowing the stem to revolve freely but preventing its accidental displacement. It may be removed by a quick sudden pull on the roller or its supporting part. The projecting portions of the balls 21 rest and revolve freely upon the upper face of the support 4, as seen clearly in Fig. 1.

The support for the plate 11 and its spring members is capable of various modifications. In Fig. 5 I have shown one of such modified forms of construction. In this form the supporting member comprises a single plate 24 to the upper face of which the plate 11 and its spring members is attached in the same manner as illustrated in Fig. 3. This plate, however, is of normal larger diameter and is folded upon itself, as shown at 25, forming the bottom member 26, corresponding to the lower plate 19 in Fig. 4, and this lower member is pierced to receive the balls 27, the opening being bulged or flanged, as shown at 28, for the same purpose as the bulge 20 in Fig. 4. The short tubular portion 29 extends upward from and is rigid with the lower member, there being an annular cavity 30 in the upper member which is covered by the plate 11, the tubular member 29 having a firm bearing in a central opening in said plate 11 and at its upper end formed with small elastic extensions 31 adapted to engage in the groove 8 the same as the extensions 23 of the tubular portion 22, and for the same purpose.

It is evident that the number of balls may be varied. There may be three, four or more. In Fig. 6 I have shown three, this being the number preferred when the device is to be used with a wooden leg, as seen in Fig. 2. In this form the plate 32 which corresponds to the plate 19 in the form shown in Fig. 1 has the bulged openings 33 for the balls 34, it being understood, however, that I may employ the form shown in Fig. 8, so far as relates to the supporting member, if preferred. In this form the spring members 12 are omitted and the tubular portion 35 is made somewhat longer, its upper end being provided with the short elastic extensions 36 which are adapted to be sprung into the annular groove or channel 6 at the upper end of the stem, serving the same function as in the construction shown in Fig. 1, the tubular portion 35, however, in this instance being made a snug fit for the bore 37 of the leg and serving by frictional engagement with the inner surface thereof, to hold the same against turning or displacement. The balls bear upon the upper surface of the supporting member 4 the same as in the form shown in Fig. 1.

Other modifications in detail may be resorted to without departing from the spirit of the invention or sacrificing any of its advantages.

What is claimed as new is:—

1. In a caster, the combination with a stem having an annular groove, of a ball supporting member having a tubular portion with elastic extensions to engage in said groove and additional spring members for holding the stem coaxially in place.

2. In a caster, a supporting member having parallel portions one of which is pierced and provided with flanges to receive balls, and a tubular portion disposed centrally of said member and having yielding extensions and a plate having spring portions rising therefrom and bent upon themselves.

3. In a caster, a supporting member having parallel portions, one of which is pierced and provided with flanges to receive balls and a tubular portion disposed centrally of said member and having yielding extensions, and balls held by said flanges and protruding beneath the same.

4. In a caster, a member provided with balls and a tubular portion with inwardly extending yielding extensions, and spring members having inner and outer members of different lengths rising from said member.

5. In a caster, a supporting member composed of parallel portions with balls held therebetween, spring members rising therefrom, and a tubular portion disposed axially of said member and having elastic extensions at its upper end, the said extensions being independent of said spring members.

6. In a caster, a member formed of parallel portions, the lower portion of which has flanged openings, a plate secured to the upper portion and having spring members, and a central tubular portion with yielding extensions at its upper end, and balls held in said flanged openings and protruding beyond said lower member.

In witness whereof, I have hereunto set my hand this 7th day of December, 1907, in the presence of two subscribing witnesses.

EDMOND SABO.

Witnesses:
ENOS B. WHITMORE,
A. NOVOSNY.